US012793578B2

(12) United States Patent
Ward

(10) Patent No.: US 12,793,578 B2
(45) Date of Patent: Nov. 10, 2026

(54) MASS HEMOPTYSIS SIMULATOR

(71) Applicant: Northwestern University, Evanston, IL (US)

(72) Inventor: Sylvonne Kiersten Ward, Chicago, IL (US)

(73) Assignee: Northwestern University, Evanston, IL (US)

( * ) Notice: Subject to any disclaimer, the term of this patent is extended or adjusted under 35 U.S.C. 154(b) by 197 days.

(21) Appl. No.: 18/632,760

(22) Filed: Apr. 11, 2024

(65) Prior Publication Data

US 2024/0346954 A1 Oct. 17, 2024

Related U.S. Application Data

(60) Provisional application No. 63/495,447, filed on Apr. 11, 2023.

(51) Int. Cl.
*G09B 23/30* (2006.01)
*G09B 23/34* (2006.01)

(52) U.S. Cl.
CPC ........... *G09B 23/303* (2013.01); *G09B 23/34* (2013.01)

(58) Field of Classification Search
CPC .............................. G09B 23/303; G09B 23/34
See application file for complete search history.

(56) References Cited

U.S. PATENT DOCUMENTS

2003/0228344 A1* 12/2003 Fields .................. F16K 15/147 128/207.15

* cited by examiner

*Primary Examiner* — Kesha Frisby
(74) *Attorney, Agent, or Firm* — Bell & Manning, LLC

(57) ABSTRACT

A mass hemoptysis simulator includes a bronchial tree that has a plurality of bronchi. A plurality of ports are mounted to openings formed in the bronchi of the bronchial tree. A fluid reservoir is connected to a port in the plurality of ports. The port to which the fluid reservoir is connected is positioned at a location on the bronchial tree at which bleeding is to be simulated. A fluid flows from the fluid reservoir into the bronchial tree to simulate the bleeding at the location.

20 Claims, 4 Drawing Sheets

Learner characteristics of simulation-based mastery learning trainees ($N = 5$)

| Characteristic | Value |
|---|---|
| No. of bronchoscopies logged, mean ± SD | 38.4 ± 8.88 |
| Prior massive hemoptysis training, *n* (%) | |
| No | 5 (100%) |
| Yes | 0 |
| Prior clinical experience with massive hemoptysis, *n* (%)* | |
| No | 2 (40%) |
| Yes | 3 (60%) |

*At the time of initial assessment.

Fig. 2

MASS HEMOPTYSIS SIMULATOR

CROSS-REFERENCE TO RELATED APPLICATION

The present application claims the priority benefit of U.S. Provisional Patent App. No. 63/495,447 filed on Apr. 11, 2023, the entire disclosure of which is incorporated herein by reference.

BACKGROUND

Airway management is very important during certain types of injuries, such as an active airway bleed. It is therefore critical that physicians be adequately trained in the handling of such situations, and taught the proper techniques for maintaining the airway. Traditional training for airway management during active airway bleeds has been performed through textbooks and videos.

SUMMARY

A mass hemoptysis simulator includes a bronchial tree that has a plurality of bronchi. A plurality of ports are mounted to openings formed in the bronchi of the bronchial tree. A fluid reservoir is connected to a port in the plurality of ports. The port to which the fluid reservoir is connected is positioned at a location on the bronchial tree at which bleeding is to be simulated. A fluid flows from the fluid reservoir into the bronchial tree to simulate the bleeding at the location.

The simulator can also include a mannequin, and the bronchial tree includes a main opening that mounts to an airway opening on the mannequin. In one embodiment, a universal connector is mounted within the main opening of the bronchial tree, and the universal connector is configured to attach to mannequins having airway openings of varying size or shape. In one embodiment, the universal connector is made from rubber or silicon. In another embodiment, the plurality of ports includes a first port mounted to a first bronchi that corresponds to an upper lung region and a second port mounted to a second bronchi that corresponds to a lower lung region. The plurality of ports can also include a third port mounted to a third bronchi that corresponds to a mid-lung region. In another embodiment, the plurality of ports includes a first port mounted a first bronchi that corresponds to a left lung region and a second port mounted to a second bronchi that corresponds to a right lung region.

In one embodiment, the ports comprise female luer locks that mount directly to the openings formed in the bronchi. In another embodiment, the ports comprise pneumatic straight push connectors. The simulator can also include material that covers at least a portion of an end of each pneumatic straight push connector, where a color of the material matches a color of the fluid. The material can be a portion of a balloon or paint.

An illustrative method of forming a mass hemoptysis simulator includes forming a plurality of openings on a bronchial tree that includes a plurality of bronchi. The openings are formed in the bronchi, and the openings are positioned at locations on the bronchial tree at which bleeding is to be simulated. The method also includes mounting a port to each opening in the plurality of openings. The method further includes connecting a fluid reservoir to a port at a desired location of the bronchial tree such that a fluid flows from the fluid reservoir into the bronchial tree to simulate the bleeding at the given location.

The method can also include mounting the bronchial tree to an airway opening on a mannequin. In an illustrative embodiment, the bronchial tree includes a main opening, and the simulator further includes a universal connector to the main opening. The universal connector is sized and shaped to mount to the airway opening on the mannequin.

In another embodiment, mounting the port to each opening includes mounting a first port to a first bronchi that corresponds to an upper lung region and mounting a second port to a second bronchi that corresponds to a lower lung region. In one embodiment, mounting the port to each opening includes mounting a first port to a first bronchi that corresponds to a left lung region and mounting a second port to a second bronchi that corresponds to a right lung region. In one embodiment, the port mounted to each opening is a female luer lock port. In another embodiment, the port mounted to each opening is a pneumatic straight push connector. The method can also include mounting a material to cover at least a portion of an end of the pneumatic straight push connector. A color of the material matches a color of the fluid. The material can be a portion of a balloon or paint.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 2 is a table that depicts study participant characteristics and experience in accordance with an illustrative embodiment.

DETAILED DESCRIPTION

Figure 1A:
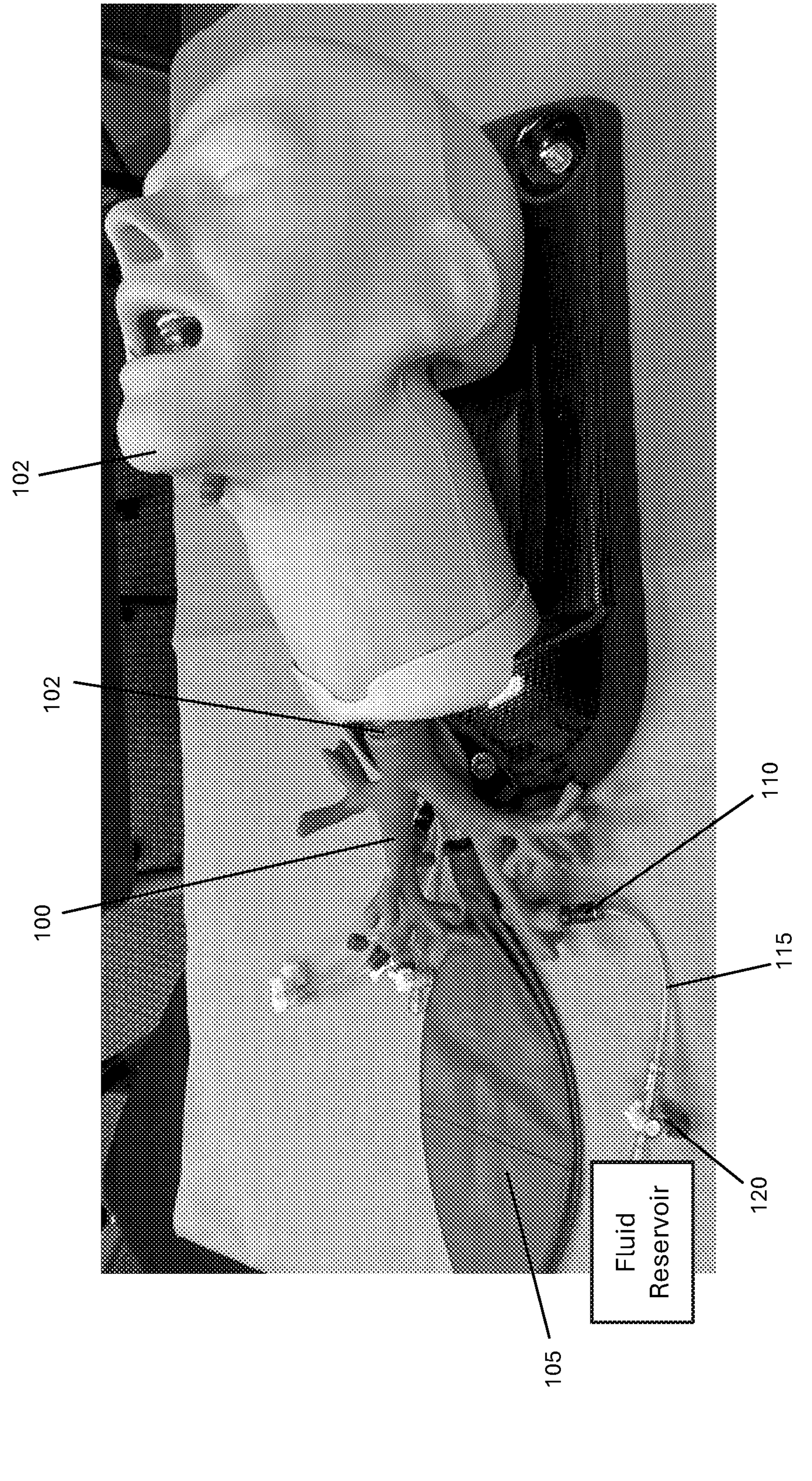
FIG. 1A depicts a massive hemoptysis simulator in accordance with an illustrative embodiment.

The management of massive hemoptysis is a high-risk, low-volume procedure that is associated with high mortality rates, and pulmonary and critical care medicine (PCCM) fellows often lack adequate training. Described herein is a system for simulation-based mastery learning (SBML), which is an educational strategy that improves skill but has not been applied to massive hemoptysis management. More specifically, described herein is a system that provides users with hands-on training to deal with airway management during an active airway bleed. More specifically, the system provides a high-fidelity simulation of mass hemoptysis. The proposed system is a significant improvement over traditional training/teaching techniques, which include classroom discussion, textbooks, videos, and observation. Conversely, the proposed system enables realistic hands-on training that allows users to actually experience and treat an active airway bleed, while maintaining the airway.

The management of massive hemoptysis is challenging and continues to carry a high risk of mortality despite advances in fiberoptic technology, diagnostic imaging, and interventional radiology. Massive hemoptysis management is a high-risk, low-volume procedure that is not formally taught in almost half of all pulmonary and critical care medicine (PCCM) fellowship programs. Existing cognitive aids to manage massive hemoptysis have the potential for offloading mental energy in this high-leverage scenario, but real-world experience remains a crucial yet inconsistent experience for learners.

Simulation-based education (SBE) is effective for teaching difficult psychomotor tasks such as emergent airway management and complex situations such as advanced cardiac life support. However, SBE does not necessarily hold learners to high, uniform standards or assess for clinical competence. Simulation-based mastery learning (SBML) is a rigorous, competency based educational model with foundations rooted in constructivist, behavioral, and social learning theories. In contrast to traditional SBE, SBML reduces or eliminates variability in trainee skill after an educational intervention by requiring each learner to meet or exceed a predetermined minimum passing standard (MPS) on a simulated skills assessment. The MPS defines the minimum skill level required to assure safe patient care. To achieve this goal, SBML requires that all trainees participate in a simulated pretest assessment, followed by educational sessions that use deliberate practice. Learners are ultimately retested via a simulated posttest until they are able to meet or exceed the MPS.

No SBML curricula currently exist for the management of massive hemoptysis. Further, prior SBE programs for massive hemoptysis management have not focused on the role of bronchoscopy, possibly because there are no commercially available mannequins capable of simulating segmental airway bleeding. Accordingly, the proposed system was developed in accordance with the following three aims: i) to design a segmental airway bleeding simulator to simulate massive hemoptysis in a realistic clinical environment; ii) to design and implement a bronchoscopic management of massive hemoptysis SBML curriculum for PCCM fellows; and iii) to evaluate if the curriculum improves skills in the simulated environment. Methods used to implement these goals are described below.

With respect to study design and setting, a pretest-posttest pilot study of the management of a simulated case of massive hemoptysis was performed among first year PCCM fellows, along with a traditionally trained comparison group, at a tertiary-care academic medical center. The simulation was conducted in situ within a bronchoscopy suite and was facilitated by an interprofessional care team that included one interventional pulmonary (IP) faculty member, two senior PCCM fellows, two registered nurses from the bronchoscopy suite, and a respiratory therapist.

The participants were all first-year PCCM fellows (N=5) who were eligible and available to participate in the testing during the study period. Exposure to the SBML educational intervention was provided as a part of the fellows' core didactics regardless of participation in the study. All participants provided written informed consent before participation. The fellowship program director was not involved in study recruitment and was blinded to enrollment status until all potential participants had consented to participate. A "traditionally trained" group (N=4; two PCCM attending physicians, one thoracic surgery advanced practice provider [APP], and one critical care medicine fellow) served as the comparison group. This group had varying levels of exposure to formal and informal training in the management of massive hemoptysis, including lecture, simulation, and experiential learning, but did not receive SBML. The study and results of the study are discussed in more detail below.

In one embodiment, the massive hemoptysis simulator can be used to selectively simulate bleeding from the right upper lobe, the right lower lobe, the left lower lobe, or any other portion of a human bronchial system. To create the massive hemoptysis simulator, a commercially available AirSim X bronchoscopy simulator (TruCorp) was used and modified. Alternatively, the simulator can be constructed from scratch, without the use of a commercially available mannequin. The simulator allows for continuous bleeding from different bronchial tree locations during the duration of a simulation. The resulting simulator is portable, maintains high fidelity of upper and lower airway anatomy, selectively bleeds from a desired portion of a segmental airway, blinds the trainee to the source of bleeding unless identified bronchoscopically, and allows for real-time adjustment of the flow rate using an intravenous pump in some embodiments.

Figure 1B:
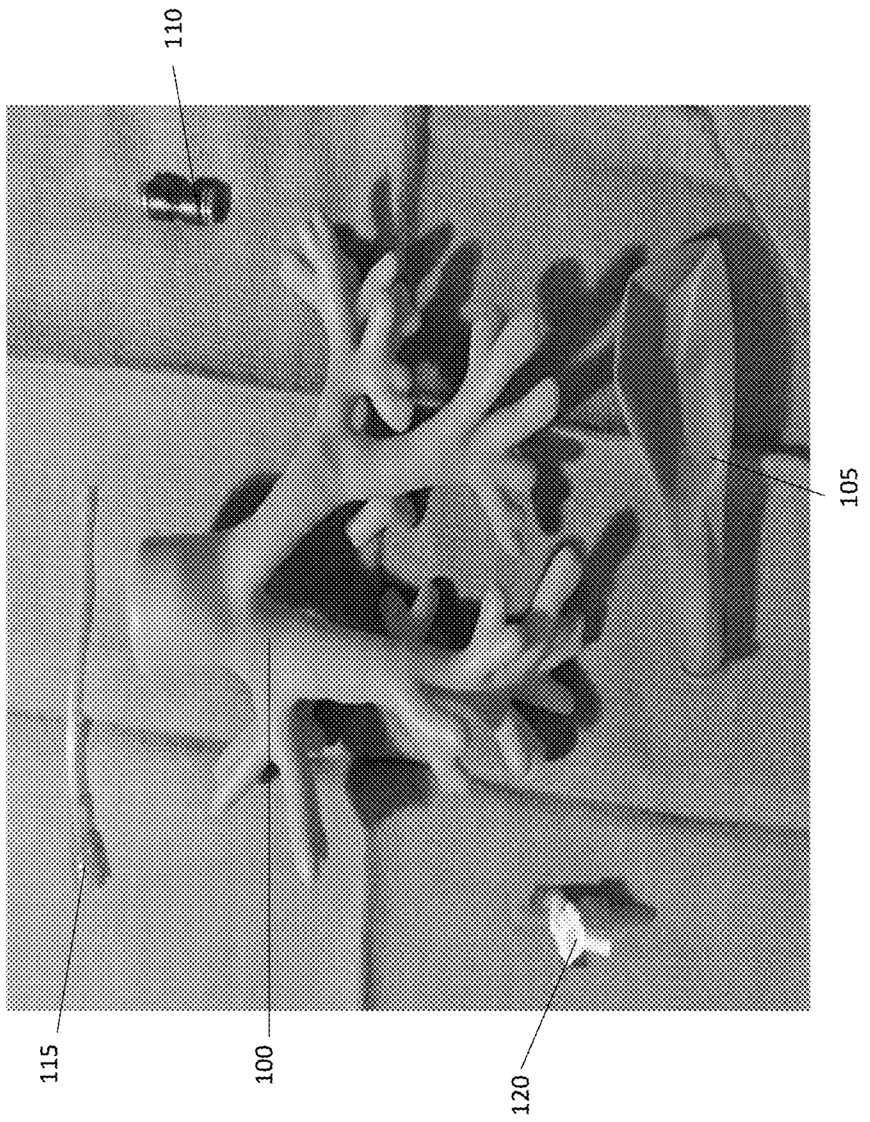
FIG. 1B depicts components of the proposed simulator system in accordance with an illustrative embodiment.

FIG. 1A depicts a massive hemoptysis simulator in accordance with an illustrative embodiment. FIG. 1B depicts components of the proposed simulator system in accordance with an illustrative embodiment. As shown, the system includes a bronchial tree (or airway) 100 connected to a mannequin 102, a balloon 105, one or more pneumatic straight push connectors 110, a luer lock 115, and a three-way stopcock 120. In alternative embodiments, the system can include fewer, additional, and/or different components. For example, as discussed below, instead of pneumatic straight push connectors, a different port can be used such as a female luer lock port. Also, instead of a three-way stopcock 120, a two-way valve or any other valve with on/off control can be used to control fluid flow. Additional supplies that can be utilized in forming the system include an intravenous (IV) pump, IV extension tubing, saline bags filled with saline solution, adhesive (e.g., glue, super glue, etc.), paperclip or other sharp object, and red food coloring.

Using the above-described components and supplies, a simulator system can be implemented as described herein. However, it is to be understood that in different embodiments, the system can be generated using different components and/or operations. A first operation in forming the system is to obtain an AirSim Advance Bronchi X (or similar mannequin that includes an airway and a bronchial tree). The bronchial tree 100 simulates a human bronchial tree, which includes all of the air passages that lead from the trachea to the lungs. The bronchial tree 100 can be made from rubber, silicon, plastic, or any other material that is able to realistically represent a human bronchial system.

The bronchial tree 100 is removed from the AirSim Advance Bronchi X (or other mannequin), and the blue lung bags (if present) are removed from the airway. In an illustrative embodiment, openings (or holes) are formed in one or more bronchus and/or bronchioles of the bronchial tree. Openings can be formed at the locations where the blue lung bags were removed. As discussed below, openings can also be formed at any other location(s) of the bronchial tree 100. These openings allow for the flow of fluid (e.g., fake blood, fake mucus, etc.) from outside of the bronchial tree 100 into an interior of the bronchial tree to simulate bleeding or another condition.

In an illustrative embodiment, the one or more openings are a plurality of openings formed in various bronchioles (and/or bronchus) such that the bronchial tree includes a plurality of different areas from which internal bleeding can be simulated. For example, the various openings can be spaced about the bronchial tree such at one or more openings are formed in an upper portion of the bronchial tree (corresponding to the upper lungs), one or more openings are formed a mid-portion of the bronchial tree (corresponding to the mid-portion of the lungs), and one or more openings are formed in a lower portion of the bronchial tree (corresponding to the lower lungs). Similarly, the various openings can be spaced about the bronchial tree such that one or more openings are formed in the left side of the bronchial tree (corresponding to the left lung) and such that one or more openings are formed in the right side of the bronchial tree (corresponding to the right lung).

In another illustrative embodiment, a pneumatic straight push connector 110 is mounted to each of the openings (or holes) formed in the bronchial tree. The pneumatic straight push connector 110 can be held in place within the opening by an adhesive in one embodiment. Alternatively, in embodiments where the bronchial tree is flexible, a friction fit may be used to secure an end of the pneumatic straight push connector 110 within the opening formed in a bronchiole/bronchus. It is noted that many commercially available straight push connectors have an end that is colored (e.g., blue). When the straight push connector is mounted within an opening formed in the bronchial tree, this coloration on the end of the connector is visible from within the bronchial tree. However, if this coloration is seen by a user that is scoping the interior of the bronchial tree to identify the location of the hemorrhage, the user will then know a possible location of the source of blood based on the coloring seen through the scope (i.e., based solely on the location of the pneumatic straight push connector). As a result, in embodiments in which a straight push connector is used that has color on its end, a balloon or other material (e.g., colored adhesive, colored tape, etc.) that matches the color of the fluid (e.g., red fake blood) can be used to camouflage the end of the straight push connector and make it indistinguishable from the fluid. The user will therefore be unable to identify the source of the bleeding by merely looking into the bronchial tree, and will instead be required to use his/her medical training to identify the location of the bleeding.

As one example, the balloon 105 can be used to camouflage (or cover) a colored portion of an end of the straight push connector 110. In an illustrative embodiment, the balloon is red such that its appearance is not easily distinguishable from the fake blood that flows through the simulator. The balloon 105 can be cut and attached to one side of the pneumatic straight push connector 110 (i.e., the end side that mounts to the opening in the bronchi) with glue or another adhesive. Once the glue has cured, the balloon is mounted such that it blocks the opening at the end of the pneumatic straight push connector 110. A hole is therefore made through the portion of the balloon 105 that covers the opening in the pneumatic straight push connector 110 to allow for the flow of fluid through the pneumatic straight push connector 110. The hole can be made using a paperclip or other sharp object such as a knife. In an alternative embodiment, instead of using a balloon to cover any color at the end of the pneumatic straight push connector 110, red paint, red tape, and/or red adhesive can be used to cover the end and help camouflage the color such that it is not visible to a user of the system.

In an alternative embodiment, instead of a pneumatic straight push connector as the port, any other type of female (or male) port may be used. For example, in one embodiment, a female (or male) luer lock port can be mounted directly to each of the openings formed in the various bronchi of the bronchial tree. These female (or male) luer lock ports can connect directly to intravenous (IV) tubing to receive the fake blood or other fluid. As a result, the use of female luer lock ports mounted directly to the bronchial tree eliminates the need for pneumatic straight push connectors, stopcocks, and additional luer locks. In an alternative embodiment, a different type of locking female (or male) port may be used instead of a luer lock.

In an embodiment in which pneumatic straight push connectors are used, IV lines can be cut to ~5 inches (the distance can be varied) in length and mounted to the luer lock 115. The three-way stopcock 120 (or other valve) is then connected to the luer lock as shown in FIG. 1A. The cut end of the IV tubing is connected to the side of the pneumatic straight push connectors 110 without the balloon (i.e., the end of the pneumatic straight push connector 110 that extends away from the bronchial tree). The red balloon side of the pneumatic straight push connector 110 is connected to a bronchiole/bronchus of the bronchial tree 100 as discussed above. The pneumatic straight push connector 110 can be mounted to an opening formed during removal of the lung bags, or as discussed above an opening can be formed in any of the bronchioles/bronchi in any desired location of the bronchial tree where blood flow is to be simulated. This process is repeated for all openings on the bronchial tree.

A saline bag is filled with a highly concentrated red blood solution created with the red food coloring and saline solution (alternatively, any other liquid may be used), and IV lines are connected to the saline bag with the appropriate length of connection tubing to reach the three-way stopcock 120 or other valve connected to the bronchial tree 100. The IV tubing from the saline bag is then connected to the three-way stopcock 120 (or other valve) that is positioned at the location on the bronchial tree where bleeding is to be simulated. The bronchial tree is also connected to the TruCorp AirSim Advance Bronchi X mannequin head (or a different mannequin/model can be used).

In an illustrative embodiment, a universal connector can be mounted to a main opening 102 of the bronchial tree 100. The universal connector also mounts to an airway opening (i.e., opening connected to the mouth) of the mannequin. The universal connector can be made from rubber, silicon, or another flexible material in one embodiment such that the bronchial tree can easily be connected to a variety of different mannequins that may have airway openings of differing size and/or shape. The universal connector can be mounted within the main opening 102 via adhesive, friction fit, etc.

Upon assembly, the device can be used for hands-on training, as discussed in more detail below. In any of the embodiments described herein, fake blood from the saline bags flows through the tubing and into a selected area (e.g., bronchiole) of the bronchial tree through the pneumatic straight push connector, luer lock port, or other port mounted to the bronchiole. The blood can flow via gravity, or alternatively a pump can be used to force blood from the saline bag into the bronchial tree. This simulates bleeding in the bronchial tree that originates at the selected area. The user being tested on the simulation can go in through the mouth opening of the mannequin with a suction device to remove some of the fake blood to make diagnosis easier. The user can also go in through the mouth of the mannequin with an imaging device (e.g., a bronchoscope) to attempt to determine where the bleeding is occurring so that the blood flow can be stopped. Upon identifying the area that is bleeding, the user can attempt to stop the bleeding using a blocker (e.g., inflatable balloon or other device) to lodge into the bronchiole/broncus and stop the bleeding. The user is then assessed on their performance. As discussed above, if while using the bronchoscope inside the bronchial tree the user sees color indicative of a port, the user may suspect (based solely on seeing the location of the port) that the bleeding occurs at that location. However, such an identification does not test the user's medical knowledge. Any coloration on the port is therefore camouflaged as discussed above such that the user cannot use port location to identify the source of bleeding.

Using this device, a simulated case scenario was performed with Olympus BF-P190 and BF-1TH190 bronchoscopes (Olympus America), 6-and 7-F Fogarty balloons (Edwards Lifesciences), and 7-and 9-F Arndt endobronchial blocker sets (Cook Medical). In alternative embodiments, different types of bronchoscopes, balloons, and/or blocker sets may be used. A 26-item "Bronchoscopy for Management of Airway Bleeding" checklist using relevant literature, best practices, and checklist design strategies was also developed. Additionally, published frameworks were applied to enhance the validity of the checklist, focusing on hypothesis-driven inquiry, content refinement, and collection of diverse viewpoints.

Content from the checklist centered on psychomotor, cognitive, and communication skills domains. The checklist divided the simulated scenario into preparatory, procedural, and postprocedural management operations. After the initial checklist was developed, a modified Delphi technique was employed with six board-certified IP faculty physicians from different institutions and four SBML content experts (two medical doctors, one Ph.D. professor, and one clinical research registered nurse) to finalize the checklist content. The scenario was tested on the traditionally trained comparison group, whose performance was assessed using the checklist, and the checklist wording was modified for clarity. Scoring for the traditionally trained group was used to assess interrater reliability (IRR) using the k-coefficient for the skills checklist.

The incident rate ratio (IRR) between evaluators was high (k=0.921). Subsequently, a different panel of 10 physicians from 6 different hospitals (two PCCM attending physicians, one thoracic surgery attending physician, five IP attending physicians, and one IP fellow) performed a virtual standard setting using the Mastery Angoff method to set the MPS. In brief, this method asks experts to review each checklist item individually and estimate the percentage of well-prepared trainees who would perform the item correctly at posttest. The mean value generated by querying each item is used to determine the MPS. Well prepared trainees are those who can perform the skill or procedure safely and independently. In the standard setting, any compulsory items whose omission would result in automatic failuer to reach the MPS were not included. Each essential step was linked in such a way that omission would virtually obligate a failuer to reach the MPS.

Within 1 week of SBML training, members of the intervention group each verbally attested to having asynchronously viewed an evidence-based, didactic online video review. This review covered epidemiology, appropriate imaging evaluation, bronchoscopic interventions, and a stepwise approach to the management of massive hemoptysis from segmental airway bleeding. Next, the participants underwent a baseline skills assessment (i.e., pretest) using the 26-item skills checklist. The simulated case scenario prompts the learner to respond to hemoptysis that develops after a transbronchial biopsy. The learner is expected to manage the simulated patient through decompensation, endotracheal intubation, and placement of a bronchial blocker, and to provide handoff to the oncoming intensive care team.

After completion of the pretest, learners participated in 90 minutes of rapid-cycle deliberate practice in the same in situ simulation environment in groups of two or three in which they cycled through the simulation with structured breaks for specific feedback, reflection, and repetition of key skills. Instructors identified key decision points for rapid-cycle deliberate practice a priori from the skills checklist. Feedback was tailored to observations based on global learner performance throughout the testing sessions. Learners were not directed to specific test items, and the checklist was never shared with the learners. Four weeks later, all participants completed a posttest assessment to evaluate whether they were able to meet or exceed the MPS. The simulated posttest case scenario was modified from the pretest, and the bleeding segment varied with each encounter. Those who were unable to meet or exceed the MPS at the initial posttest underwent an additional 60-minute cycle of deliberate skills practice on the simulator, followed by retesting within 2 weeks of the initial posttest attempt, until the MPS was achieved.

Learner characteristics including age, gender, number of logged bronchoscopies, and self-reported patient experience with airway bleeding management were collected by self-reported questionnaire and procedure log information. Learners also reported pre-and postintervention confidence in their ability to perform bronchoscopy and manage massive hemoptysis, as well as their perceptions of simulation-based curricula. Survey data were collected and stored using Qualtrics XM software (Qualtrics). The checklist scoring, performed by a primary rater, was dichotomous and graded as 1 (done correctly) or 0 (not done or done incorrectly). If learners required prompting at any point during the scenario, they would not receive credit for completing the corresponding checklist item.

Descriptive statistics were used to report participant demographic data, clinical experience, and learner performance and self-confidence. Given the small sample of learners, tests of statistical significance were not applied to the results of this pilot intervention. Percent agreement for IRR for the SBML group was reported because there was not enough variation to calculate a k-statistic. Statistical analysis was performed using GraphPad Prism (version 9.0; GraphPad Software).

All five eligible learners consented to participate in the study and completed SBML training. FIG. 2 is a table that depicts study participant characteristics and experience in accordance with an illustrative embodiment. Baseline experience with bronchoscopy before participating in the study was variable, but all participants had logged at least 25 bronchoscopy procedures at the time of enrollment. The traditionally trained providers described above served as a comparison group. The MPS was set at 23 of 26 correct (88%) on the skills checklist. None of the SBML trainees met the MPS (mean, 67.7±8.42% [standard deviation]) on the pretest. After completion of the SBML training, posttest scores improved (mean, 92.3±5.43%). Three participants met or exceeded the MPS on the initial posttest, and two required an additional cycle of deliberate practice, exceeding the MPS on the first additional posttest. Additionally, SBML-trained participants outperformed the traditionally trained comparison group before and after the SBML intervention.

Figure 3:
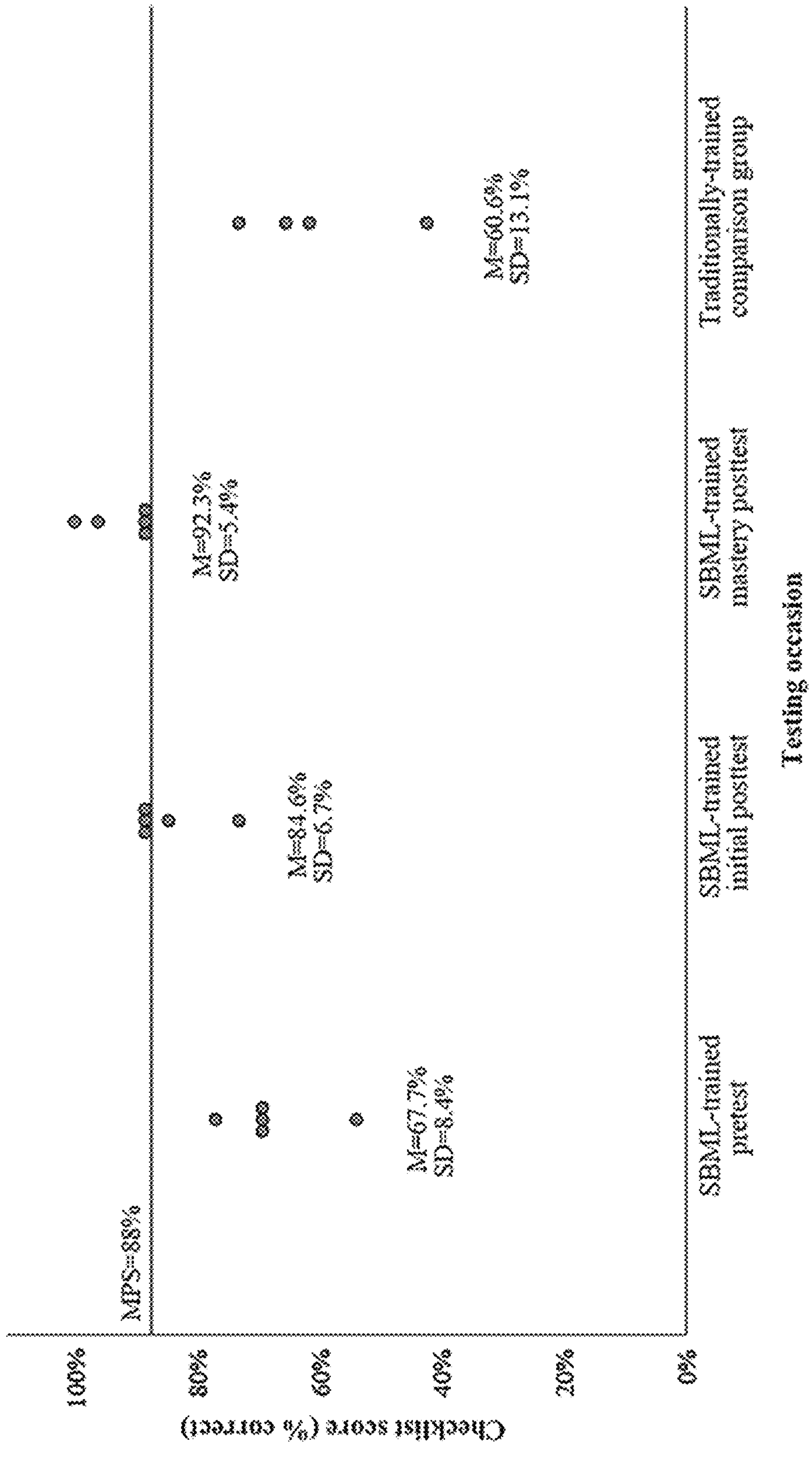
FIG. 3 is a diagram that depicts pretest and posttest scores (percentage correct) on a 26-item massive hemoptysis management checklist among SBML-trained fellows and traditionally trained providers in accordance with an illustrative embodiment.

FIG. 3 is a diagram that depicts pretest and posttest scores (percentage correct) on a 26-item massive hemoptysis management checklist among SBML-trained fellows and traditionally trained providers in accordance with an illustrative embodiment. In FIG. 3, each circle represents an individual participant, M=mean, MPS=minimum passing standard, SBML=simulation-based mastery learning, and SD=standard deviation. The percent agreement between raters for the SBML group was 100%. The most consistently missed or incorrectly performed checklist items among SBML trainees before the intervention included switching to a smaller bronchoscope, loading and securing the bronchial blocker, and verbalizing a reinspection plan. Improvement in performance for each of these items was observed at the time of the first posttest attempt.

Participants' confidence in managing massive hemoptysis showed improvement in all domains. All strongly agreed that participation in the simulation experience would improve their performance in managing a real case of massive hemoptysis and that repetitive practice with simulator increased the educational merit of the experience, as did its interprofessional nature.

In summary, airway bleeding is a known complication of bronchoscopy, yet strikingly few PCCM trainees undergo formal training or competency assessment for such an event. Experiential learning can be difficult to guarantee because of its unpredictability and relative rarity of occurrence. The pilot study addresses this gap by designing an airway bleeding simulator and implementing and assessing an SBML curriculum. The first aim was to develop a simulator capable of reproducing airway bleeding because none are commercially available and cadaver training is resource-intensive.

By modifying an available mannequin with equipment procured in the clinical environment, a realistic and reproducible simulator was created. The simulator may be modified to bleed from any segmental bronchus, ensuring variability with retesting. The simulator is portable, and this portability allows for the simulation to be run in any bronchoscopy suite, an intensive care unit, etc.

As discussed, an SBML curriculum for bronchoscopic management of massive hemoptysis was also designed and implemented. The pilot results demonstrate successful implementation of the curriculum, which was positively received by fellows. As in the case of other complex procedures, successful management of massive hemoptysis entails a high degree of cognitive load alongside the application of a technical skill. The simulation was conducted in a hospital bronchoscopy suite and involved the full interprofessional bronchoscopy team to foster a shared cognitive approach, mimicking real-world emergencies. This is the first high-fidelity SBML curriculum for massive hemoptysis. The value of SBML for PCCM relevant skills has been demonstrated across several domains, including cognitive procedures like advanced cardiac life support, advanced communication in breaking bad news and discussing code status, and procedures including central venous catheter insertion, thoracentesis, and lumbar puncture. The present work adds to the growing body of literature that suggests that SBML may also be effective for skills transfer in high-risk, low-volume procedures.

A final aim of the proposed system was to evaluate whether the SBML curriculum would improve skills in massive hemoptysis management in the simulated environment. No validated checklist specific to the management of massive hemoptysis existed, so the instrument was created to fill this gap. The MPS was set with input from diverse disciplines (interventional pulmonology, thoracic surgery), professions (medical doctors, APPS, registered nurses), and practice settings (academic and community), improving its validity and generalizability. After participating in the curriculum, participants unanimously agreed that the simulated scenario would improve their ability to manage real airway bleeding emergencies, without evidence of evaluation apprehension. Although self-confidence does not always map to procedural competence, the participants' objective skills in managing the scenario also improved following completion of the SBML curriculum, with all five learners ultimately achieving the MPS. Despite self reported clinical experience in managing massive hemoptysis in three of our five learners, none of them met the MPS at the pretest. This suggests that clinical exposure alone may be insufficient to guarantee competence.

An unexpected observation was that the SBML trainees achieved higher baseline scores before the intervention than the traditionally trained comparison group. This suggests that independently practicing providers may benefit from dedicated training for massive hemoptysis management. Furthermore, SBML trainees' higher performance may reflect the impact of the asynchronous lecture, which only the SBML group viewed before the baseline assessment. Despite this exposure, none of the SBML participants met the MPS on the pretest, supporting the notion that lecture-based training may be insufficient for teaching complex psychomotor skills such as massive hemoptysis management.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A mass hemoptysis simulator comprising:
- a bronchial tree that includes a plurality of bronchi;
- a plurality of ports mounted to openings formed in the plurality of bronchi of the bronchial tree; and
- a fluid reservoir sized to store a liquid simulated blood solution and connected to a port in the plurality of ports, wherein the port is positioned at a location on the bronchial tree at which bleeding is to be simulated, and wherein the liquid simulated blood solution flows from the fluid reservoir into the bronchial tree to simulate the bleeding at the location.

2. The simulator of claim 1, further comprising a mannequin, wherein the bronchial tree includes a main opening that mounts to an airway opening on the mannequin.

3. The simulator of claim 2, further comprising a universal connector mounted within the main opening of the bronchial tree, wherein the universal connector is configured to attach to mannequins having airway openings of varying size or shape.

4. The simulator of claim 3, wherein the universal connector is made from rubber or silicon.

5. The simulator of claim 1, wherein the plurality of ports includes a first port mounted to a first bronchi that corresponds to an upper lung region and a second port mounted to a second bronchi that corresponds to a lower lung region.

6. The simulator of claim 5, wherein the plurality of ports includes a third port mounted to a third bronchi that corresponds to a mid-lung region.

7. The simulator of claim 1, wherein the plurality of ports includes a first port mounted to a first bronchi that corresponds to a left lung region and a second port mounted to a second bronchi that corresponds to a right lung region.

8. The simulator of claim 1, wherein the ports comprise female luer locks that mount directly to the openings formed in the bronchi.

9. The simulator of claim 1, wherein the ports comprise pneumatic straight push connectors.

10. The simulator of claim 9, further comprising material that covers at least a portion of an end of each pneumatic straight push connector, wherein a color of the material matches a color of the fluid.

11. The simulator of claim 10, wherein the material comprises a portion of a balloon or paint.

12. A method of forming a mass hemoptysis simulator, the method comprising:

forming a plurality of openings on a bronchial tree that includes a plurality of bronchi, wherein the openings are formed in the plurality of bronchi, and wherein the openings are positioned at locations on the bronchial tree at which bleeding is to be simulated;

mounting a port to each opening in the plurality of openings; and connecting a fluid reservoir, sized to receive a liquid simulated blood solution, to a port at a desired location of the bronchial tree such that the liquid simulated blood solution flows from the fluid reservoir into the bronchial tree to simulate the bleeding at the desired location.

13. The method of claim 12, further comprising mounting the bronchial tree to an airway opening on a mannequin.

14. The method of claim 13, wherein the bronchial tree includes a main opening, and further comprising mounting a universal connector to the main opening, wherein the universal connector is sized and shaped to mount to the airway opening on the mannequin.

15. The method of claim 12, wherein mounting the port to each opening includes mounting a first port to a first bronchi that corresponds to an upper lung region and mounting a second port to a second bronchi that corresponds to a lower lung region.

16. The method of claim 12, wherein mounting the port to each opening includes mounting a first port to a first bronchi that corresponds to a left lung region and mounting a second port to a second bronchi that corresponds to a right lung region.

17. The method of claim 12, wherein the port mounted to each opening comprises a female luer lock port.

18. The method of claim 12, wherein the port mounted to each opening comprises a pneumatic straight push connector.

19. The method of claim 18, further comprising mounting a material to cover at least a portion of an end of the pneumatic straight push connector, wherein a color of the material matches a color of the fluid.

20. The method of claim 19, wherein the material comprises a portion of a balloon or paint.

* * * * *